US012654471B2

(12) United States Patent
Van Heijst

(10) Patent No.: US 12,654,471 B2
(45) Date of Patent: Jun. 16, 2026

(54) PRINTER APPARATUS AND PRINT METHOD FOR PREPARING AN IMAGE HAVING MATT PORTIONS AND GLOSSY PORTIONS

(71) Applicant: Canon Production Printing Holding B.V., Venlo (NL)

(72) Inventor: Cornelis P.M. Van Heijst, Venlo (NL)

(73) Assignee: Canon Production Printing Holding B.V., Venlo (NL)

( * ) Notice: Subject to any disclaimer, the term of this patent is extended or adjusted under 35 U.S.C. 154(b) by 234 days.

(21) Appl. No.: 18/206,412

(22) Filed: Jun. 6, 2023

(65) Prior Publication Data

US 2023/0406008 A1 Dec. 21, 2023

(30) Foreign Application Priority Data

Jun. 14, 2022 (EP) ..................................... 22179040

(51) Int. Cl.
*B41J 11/00* (2006.01)

(52) U.S. Cl.
CPC ............................... *B41J 11/00212* (2021.01)

(58) Field of Classification Search
CPC .............. B41J 11/00212; B41J 11/0015; B41J 11/00214; B41M 3/008; B41M 7/0081; B41M 5/0017
See application file for complete search history.

(56) References Cited

U.S. PATENT DOCUMENTS

2012/0069109 A1 3/2012 Anderson et al.
2013/0127960 A1 5/2013 Edwards

FOREIGN PATENT DOCUMENTS

EP 3 822 085 A1 5/2021
EP 3 890 985 A1 10/2021
JP 2014168946 A * 9/2014 ............ B41J 2/2117
WO WO 2020/114757 A1 6/2020

OTHER PUBLICATIONS

European Search Report, issued in EP Application No. 22 17 9040 dated Nov. 25, 2022.

* cited by examiner

*Primary Examiner* — Justin Seo

(74) *Attorney, Agent, or Firm* — Birch, Stewart, Kolasch & Birch, LLP

(57) ABSTRACT

A printer apparatus for recording images having matt portions and glossy portions and a print method for recording images having matt portions and glossy portions onto a porous media are disclosed. The method involves locally applying a support layer and subsequently applying an image portion on top of the support layer.

8 Claims, 5 Drawing Sheets

PRINTER APPARATUS AND PRINT METHOD FOR PREPARING AN IMAGE HAVING MATT PORTIONS AND GLOSSY PORTIONS

The present invention relates to a printer apparatus for recording images having matt portions and glossy portions. The invention further relates to a print method for recording images having matt portions and glossy portions.

BACKGROUND OF THE INVENTION

Methods for printing images using radiation-curable ink are well known in the art. In such methods, an image is formed by applying droplets of a radiation-curable ink onto a recording medium and fixing the ink. Fixing of the ink can be done by irradiating the ink with suitable radiation, for example ultraviolet radiation. Robust images may be formed using such methods.

The gloss level of a printed image is an important feature of the image. The gloss level can be high (glossy images), low (matt images) or have a gloss level in between. Gloss of an image can be influenced in a number of ways. It is preferred to have the option to print images, wherein the gloss level may be locally varied. By locally varying the gloss level, images having matt portions and gloss portions may be printed.

US2013/0127960 describes a method for printing an image using radiation-curable ink. After curing of the ink, an overcoat is applied on top of the image to change the gloss of the image. A disadvantage of this method is that an additional type of ink and additional print head for applying said overcoat is needed, which increases the complexity and cost of the printer.

EP3890985 discloses a method for printing images having matt portions and glossy portions. The difference in gloss levels is achieved by applying a first curing strategy for forming the matt portions and applying a second curing strategy for forming the gloss portions. The method disclosed in EP3890985 does not require an additional type of ink to change the gloss level of the image.

However, a disadvantage of the method disclosed in EP3890985 is the limited range of media for which the method can be applied. When using the method on a porous media, the ink may penetrate into the medium, which may result in unwanted phenomena such as show-through and incomplete curing of the ink.

It is therefore an object of the invention to provide a method for printing images having matt portions and glossy portions that is suitable for use on a broad range of recording media including porous media.

The object of the invention is achieved in a method for printing an image onto a porous recording medium, the image having matt portions and glossy portions, the method comprising the steps of:

a. forming a support layer on a first section of the recording medium by applying a radiation-curable ink and forming a first image portion on a second section of the recording medium by applying a radiation-curable ink;
b. fixing the support layer and the first image portion;
c. forming a second image portion on top of the support layer in the first section of the recording medium by applying a radiation-curable ink;
d. fixing the second image portion.

An image may be printed on a recording medium. The recording medium may be a porous recording medium. The porous medium may be a recording medium that is capable of absorbing fluids, such as printing inks when they are applied onto the recording medium. A well-known class of porous media is the class of so-called non-coated media. Examples of non-coated media are plain paper or uncoated paper. The non-coated media are, in contrast to coated media, capable of absorbing fluids such as inks.

The image may have matt and glossy portions. The matt portions of the image may be portions having a low gloss level, whereas the glossy portions may be portions having a high gloss level. In addition to the glossy portions and the matt portions, the image may optionally comprise non-printed portions and/or semi-gloss options. A non-printed portion is a portion, where no ink is applied onto the recording medium. A semi-gloss portion is a portion that has a gloss level in between the gloss level of the matt and glossy portions.

In step a, a support layer is formed on a first section of the recording medium by applying a radiation-curable ink and a first image portion is formed on a second section of the recording medium by applying a radiation-curable ink.

The radiation-curable ink may be applied on the recording medium in a predetermined pattern. The predetermine pattern may include at least a support layer in the first section of the recording medium and a first image portion in the second section of the recording medium. The ink may be applied using a plurality of techniques, such as, but not limited to jetting the ink onto the recording medium using an inkjet print head. The print head may be for example a thermal inkjet print head or a piezo electric inkjet print head. The printer may comprise a plurality of inkjet print heads. One type or color of ink may be used to form the image, but alternatively more than one type and/or color of ink may be used. A Cyan, a Magenta, a Yellow and a blacK ink may be used to form the image. In addition, one or more of a white ink, brown ink, grey ink, light magenta, light cyan, red, green, orange, purple ink may be used. Further, one or more of a primer composition, an overcoat composition and a metallic ink may be used.

The ink may be a radiation-curable ink. The radiation-curable ink may comprise a radiation-curable medium. The radiation-curable medium may comprise at least one radiation-curable component. A radiation-curable component is a component that may react (e.g. polymerize) under influence of suitable radiation, such as electromagnetic radiation, e.g. ultraviolet (UV) radiation. Examples of radiation-curable components are epoxides and (meth)acrylates. (Meth-)acrylates may comprise one or more reactive groups for forming an acrylate polymer. The radiation-curable medium may comprise one type of radiation curable compound or alternatively, the radiation-curable medium may comprise a mixture of radiation-curable compounds.

The radiation-curable medium may further comprise a solvent, such as water or an organic solvent. The solvent may be added to the radiation curable medium to tune ink properties, such as viscosity.

Further, additional components may be added to the radiation curable medium. For example, the radiation curable medium may comprise one or more surfactants, one or more photo initiators, inhibitors, antibacterial components and anti-fungi components. The radiation curable ink composition may further comprise a colorant, such as a pigment, a dye or a mixture thereof. Further, the radiation curable inkjet ink composition may comprise a mixture of dyes and/or a mixture of pigments. The colorant may provide the ink composition with a predetermined color.

In the method according to the present invention, in step b, the support layer and the first image portion are fixed. By fixing the support layer and the first image portion, the ink layer may be stabilized onto the recording medium. By stabilizing the ink layer onto the recording medium, unwanted effects, such as (excessive) penetration of the ink into the recording medium and/or color bleeding may be prevented. In case one or more solvents are present in the ink composition, the solvent may be removed or the amount of solvent may be reduced when fixing. Fixing may include a treatment using heat and/or radiation. Preferably, the treatment includes treatment with a suitable type of radiation to induce a polymerization reaction in the radiation-curable ink. Preferably, the radiation used is UV-radiation. Upon irradiation with UV radiation, a UV-curable ink composition may undergo a polymerization reaction, which results e.g. in a viscosity increase of the ink, which prevents penetration of the ink in the porous recording medium. The polymerization may be a partial polymerization, which is also referred to as pinning of the ink, or may be a full polymerization reaction. By fixing the support layer, the support layer may become sufficiently stable to receive further layer of inks. By fixing the first image portion, a matt image portion may be formed. Preferably, fixing of the support layer and first image portion may be performed within 3 seconds after applying the ink onto the recording medium, preferably within 1 second after applying the ink onto the recording medium.

In step c, a second image portion is formed on top of the support layer in the first section of the recording medium by applying a radiation-curable ink. The radiation-curable ink may be applied on the recording medium in a predetermined pattern. The predetermined pattern may include at least a support layer in the first section of the recording medium and a first image portion in the second section of the recording medium. The ink may be applied using a plurality of techniques, such as, but not limited to jetting the ink onto the recording medium using an inkjet print head. The print head may be for example a thermal inkjet print head or a piezo electric inkjet print head. The printer may comprise a plurality of inkjet print heads. One type or color of ink may be used to form the image, but alternatively more than one type and/or color of ink may be used. A Cyan, a Magenta, a Yellow and a blacK ink may be used to form the image. In addition, one or more of a white ink, brown ink, grey ink, light magenta, light cyan, red, green, orange, purple ink may be used. Further, one or more of a primer composition, an overcoat composition and a metallic ink may be used.

The second image portion may be formed using the same inks as used for forming the first image portion.

In step d, the second image portion is fixed. By fixing the second image, the ink layer may be stabilized onto the support layer applied onto the recording medium. By stabilizing the ink layer onto the recording medium, unwanted effects, such as color bleeding may be prevented. In case one or more solvents are present in the ink composition, the solvent may be removed or the amount of solvent may be reduced when fixing. Fixing may include a treatment using heat and/or radiation. Preferably, the treatment includes treatment with a suitable type of radiation to induce a polymerization reaction in the radiation-curable ink. Preferably, the radiation used is UV-radiation. Upon irradiation with UV radiation, a UV-curable ink composition may undergo a polymerization reaction, which results e.g. in a viscosity increase of the ink, which prevents penetration of the ink in the porous recording medium. The polymerization may be a partial polymerization, which is also referred to as pinning of the ink, or may be a full polymerization reaction.

The second image portion, which is applied on top of the support layer, may not penetrate into the recording medium, because the presence of the support layer may block penetration of the second image portion into the recording medium. Since the second image portion may not penetrate into the recording medium, the second image portion may be allowed some time to spread over the support layer thereby forming a smooth layer. After fixing, the smooth ink layer may result in an image portion having a high gloss.

The time interval between applying the second image portion and fixing the second image portion may be larger than the time interval between applying the first image portion and fixing the first image portion.

Preferably, fixing of the second image portion may be performed at least 3 seconds after applying the ink onto the recording medium, preferably at least 30 seconds after applying the ink onto the recording medium.

By locally forming a support layer, an image having both matt portions and glossy portions may be formed on a porous recording medium.

In an embodiment, the support layer has the same color as the recording medium. The first image portion may be applied directly onto the recording medium, whereas the second image portion is applied onto the support layer. In case the support layer have the same color, than differences in color or optical density between the first image portion and second image portion may be prevented. A support layer having the same or similar color as the recording medium may be applied by applying an appropriately colored ink. Optionally, the support layer may be formed by applying a plurality of differently colored inks, which in combination form a support layer having a color that is the same or similar to the color of the recording medium.

The recording medium may be white, off-white or colorless. It is desired that the visual appearance of the first image portion and the second image portion differ as little as possible, except for their gloss levels. If the recording medium is white, the support layer may be formed by white ink. If the recording medium is off-white, the support layer may be formed by applying a relative large amount of white ink and a small amount of at least one type of colored ink, to match the color of the recording medium.

If the recording medium is colorless, then a colorless ink may be used for applying the support layer.

In an embodiment, the support layer is applied by applying a radiation-curable gelling ink. A radiation-curable gelling ink is an ink composition that is radiation-curable and that undergoes an increase in viscosity after being applied onto the recording medium.

The increase in viscosity may decrease or prevent penetration of the ink into the porous recording medium.

The viscosity increasing property may be provided by a gelling agent. A gelling agent is also referred to as gellant, rheology modifier or thickener. Suitable gelling agents are known in the art. Non-limiting examples of gellants used in gelling radiation-curable ink compositions are waxes, such as natural waxes and long chain carboxylic acids, and ketones.

In a further embodiment, the first image portion is also applied by applying a radiation-curable gelling ink. The increase in viscosity may decrease or prevent penetration of the ink into the porous recording medium.

In a further embodiment, the second image portion is applied by applying a radiation-curable gelling ink. The increase in viscosity controls the spread of the droplet onto the recording medium. The droplets may spread over the recording medium to give a smooth ink layer that results in a high gloss image, but excessive spreading that may result in color bleeding may be prevented.

In an embodiment, a time interval between applying a second image portion and fixing the second image portion is in the range of 3 seconds to 200 seconds.

The time interval may between applying a second image portion and fixing the second image portion may be controlled to be in the range of 3 seconds to 200 seconds. The time interval may be controlled by controlling at least one of the distance between the ink applicator and the curing unit, the speed of movement of the recording medium with respect to the curing unit, the angle of inclination of the radiation emitted by the curing unit with respect to the recording medium and the distance between the recording medium and the curing unit. The skilled person will know how to adjust these parameters to ensure the time interval between applying radiation-curable ink and curing the ink is in the range of 3 seconds to 200 seconds. By allowing at least three seconds between jetting and curing, the ink droplets applied onto the recording medium have time to spread over the recording medium, high gloss images may be obtained. Further, the print quality may be enhanced by allowing the droplets to spread.

In an embodiment, step a is repeated before step c is performed.

The support layer and/or the first image portion may be formed by applying a plurality of layers on top of one another. The combined layers may be fixed after the application of each individual layers. Alternatively, the layers may be fixed after a plurality of layers has been applied.

In an embodiment, in step c, the second image portions is applied in a plurality of ink layers.

The second image portion may be formed by applying a plurality of layers on top of one another. Preferably, the layers forming the second image portions are fixed after all layers have been applied. However, alternatively, one or more fixing steps may be performed after the application of one or more layers.

In an embodiment, the support layer may be applied using a first ink applicator and the second image portion may be applied using a second ink applicator. Optionally, the first image layer may be applied using the first ink applicator. The ink first and second ink applicators may comprise one or more ink ejecting units. The second ink applicator may be positioned downstream in a direction of recording medium transport with respect to the first ink applicator. The first ink applicator may apply the support layer onto the recording medium. The second ink applicator may apply the second image portion onto the recording medium. In between applying the support layer and the second image portion, the support layer may be fixed.

Optionally, the ink applicators may comprise at least one print head, wherein the print head comprises a plurality of droplet ejecting regions, wherein a first droplet ejection region is configured to in operation apply the first image portion onto the recording medium and a second droplet ejection region is configured to in operation apply the second image portion onto the recording medium.

In an alternative embodiment, the support layer and the first image portion may be applied onto the recording medium and may be fixed. The first image portion may be applied using a first ink applicator. After fixing, the recording medium may be moved backwards in the direction of medium transport. Subsequently, the second image portion may be applied by the first ink applicator.

In an aspect of the invention, a printing apparatus is provided, the printing apparatus comprising:

A media support for supporting a recording medium;

A first ink applicator configured to in operation form a support layer on the recording medium;

A second ink applicator configured to in operation form an image portion to the recording medium;

A fixing unit;

A controller configured to control the printing apparatus to perform a method according to the present invention.

The printing apparatus may further comprise a media support. The media support may be configured to in operation support the recording medium. Optionally, the recording medium may be moved in a medium transport direction. The medium support may be a flat table. Optionally, the media support may comprise an endless belt. The medium support may comprise holes for applying an underpressure. Applying an underpressure may fix the recording medium to the medium support.

Optionally, the printing apparatus may comprise medium transport unit. The medium transport unit may be configured to in operation move the recording medium relative to the printer in the medium transport direction.

The printing apparatus may further comprise a first ink applicator configured to in operation form a support layer on the recording medium. The applicator may be configured to apply a predetermined pattern of radiation-curable ink onto the recording medium to form a support. The radiation-curable ink applicator may for example be a roller or an inkjet print head. An inkjet printer comprises a plurality of nozzles for ejecting droplets of ink onto the recording medium. Preferably, the printing apparatus may comprise a plurality of ink applicators to apply several types of ink onto the recording medium. The several types of ink may comprise several colors of ink, such as one or more of the following colors: cyan, magenta, yellow, black, white, red, green, orange, purple, light cyan, light magenta, grey) or other types of ink such as primer, overcoat or metallic ink.

The printing apparatus may further comprise a second ink applicator configured to in operation form an image portion on the recording medium. The applicator may be configured to apply a predetermined pattern of radiation-curable ink onto the recording medium to form an image portion. The radiation-curable ink applicator may for example be a roller or an inkjet print head. An inkjet printer comprises a plurality of nozzles for ejecting droplets of ink onto the recording medium. Preferably, the printing apparatus may comprise a plurality of ink applicators to apply several types of ink onto the recording medium. The several types of ink may comprise several colors of ink, such as one or more of the following colors: cyan, magenta, yellow, black, white, red, green, orange, purple, light cyan, light magenta, grey) or other types of ink such as primer, overcoat or metallic ink.

The printing apparatus may comprise a fixing unit, the fixing unit being configured to in operation fixate the ink applied onto the recording medium. The fixing unit may comprise at least one of a heater and a radiation emitting unit. Preferably, the fixing unit comprises a radiation-emitting unit, preferably a UV-emitting unit. Optionally, the fixing unit may comprise a plurality of radiation-emitting units.

The printing apparatus may comprise a controller configured to control the ink-jet printer to perform a method according to the present invention. The printer apparatus is thus configured to perform the method according to the present invention.

BRIEF DESCRIPTION OF THE DRAWINGS

The present invention will become more fully understood from the detailed description given herein below and the accompanying drawings which are given by way of illustration only, and thus are not limitative of the present invention, and wherein.

In the drawings, same reference numerals refer to same elements.

DETAILED DESCRIPTION OF THE PREFERRED EMBODIMENTS

Figure 1A:
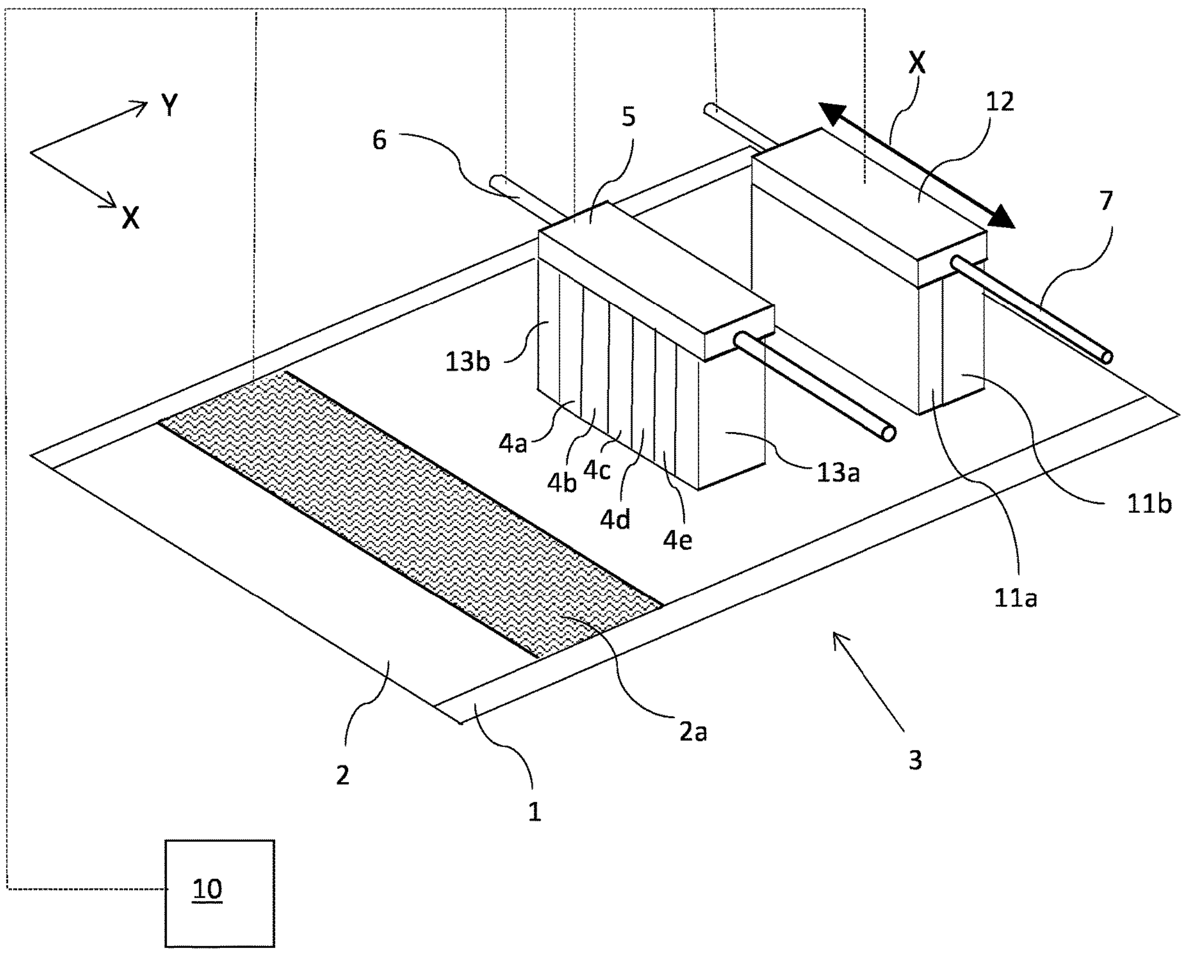
FIG. 1A shows a schematic representation of a first embodiment of an inkjet printing system.

The present invention will now be described with reference to the accompanying drawings, wherein the same reference numerals have been used to identify the same or similar elements throughout the several views.

Figure 1B:
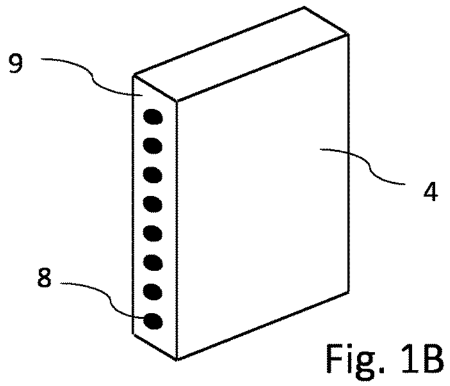
FIG. 1B shows a schematic representation of an inkjet print head.

FIG. 1A shows an ink jet printing assembly 3. The ink jet printing assembly 3 comprises supporting means for supporting an image receiving medium 2. The supporting means are shown in FIG. 1A as a flat surface 1, but alternatively, the supporting means may be a platen, for example a rotatable drum that is rotatable around an axis. The supporting means may be optionally provided with suction holes for holding the image receiving medium in a fixed position with respect to the supporting means. The ink jet printing assembly 3 comprises print heads 4$a$-4$e$, mounted on a scanning print carriage 5. The scanning print carriage 5 is guided by suitable guiding means 6 to move in reciprocation in the main scanning direction X. Each print head 4$a$-4$e$ comprises an orifice surface 9, which orifice surface 9 is provided with at least one orifice 8, as is shown in FIG. 1B. The print heads 4$a$-4$e$ are configured to eject droplets of marking material onto the image receiving medium 2.

The image receiving medium 2 may be a medium in web or in sheet form and may be composed of e.g. paper, cardboard, label stock, coated paper, plastic or textile. Alternatively, the image receiving medium 2 may also be an intermediate member, endless or not. Examples of endless members, which may be moved cyclically, are a belt or a drum. The image receiving medium 2 is moved in the sub-scanning direction Y over the flat surface 1 along four print heads 4$a$-4$e$ provided with a fluid marking material.

The image receiving medium 2, as depicted in FIG. 1A is locally heated or cooled in the temperature control region 2$a$. In the temperature control region 2A, temperature control means (not shown), such as heating and/or cooling means may be provided to control the temperature of the receiving medium 2. Optionally, the temperature control means may be integrated in the supporting means for supporting an image receiving medium 2. The temperature control means may be electrical temperature control means. The temperature control means may use a cooling and/or heating liquid to control the temperature of the image receiving medium 2. The temperature control means may further comprise a sensor (not shown) for monitoring the temperature of the image receiving medium 2.

A scanning print carriage 5 carries the five print heads 4$a$-4$e$ and may be moved in reciprocation in the main scanning direction X parallel to the platen 1, such as to enable scanning of the image receiving medium 2 in the main scanning direction X. Only five print heads 4$a$-4$e$ are depicted for demonstrating the invention. In practice an arbitrary number of print heads may be employed. In any case, at least one print head 4$a$-4$e$ per color of marking material is placed on the scanning print carriage 5. For example, for a black-and-white printer, at least one print head 4$a$-4$e$, usually containing black marking material is present. Alternatively, a black-and-white printer may comprise a white marking material, which is to be applied on a black image-receiving medium 2. For a full-color printer, containing multiple colors, at least one print head 4$a$-4$e$ for each of the colors, usually black, cyan, magenta and yellow is present. Preferably, at least one of the print heads 4$a$-4$e$ contains white ink or a colorless ink. Often, in a full-color printer, black marking material is used more frequently in comparison to differently colored marking material. Therefore, more print heads 4$a$-4$e$ containing black marking material may be provided on the scanning print carriage 5 compared to print heads 4$a$-4$e$ containing marking material in any of the other colors. Alternatively, the print head 4$a$-4$e$ containing black marking material may be larger than any of the print heads 4$a$-4$e$, containing a differently colored marking material.

The carriage 5 is guided by guiding means 6. These guiding means 6 may be a rod as depicted in FIG. 1A. Although only one rod 6 is depicted in FIG. 1A, a plurality of rods may be used to guide the carriage 5 carrying the print heads 4. The rod may be driven by suitable driving means (not shown). Alternatively, the carriage 5 may be guided by other guiding means, such as an arm being able to move the carriage 5. Another alternative is to move the image receiving material 2 in the main scanning direction X.

The print head further comprises pinning lamps 13$a$, 13$b$. The pinning lamps may be any suitable type of lamp, including UV light bulbs, mercury lamps or LEDs. Alternatively (not shown) radiation for pinning may be received from the curing means 11 and directed upstream in media transport direction using one or more mirrors, or using an optical fibre. The pinning lamps may emit radiation to selected portions of the deposited ink and may consequently pin the ink in the selected portions of the image. Pinning is also called preliminary curing or partial curing. When pinning, a polymerization reaction is induced in the ink, thereby increasing the viscosity of the ink. During pinning, polymerization may not be completed. Completion of the polymerization may occur in a later curing step. Pinning is an example of fixing. Alternatively, the pinning lamps may fully cure the ink in the selected portions of the image. Completely curing is also an example of fixing. The irradiation of the ink by the lamps may be controlled in many ways. Non-limiting examples include splitting the print heads into a plurality of zones, wherein image portions to be pinned are printed by a first zone and pinned using the pinning lamps 13 and wherein image portions not to be pinned are printed by a second zone and not irradiated by the pinning lamps 13. Alternatively, the image portions to be pinned may be printed in a first swath, wherein during the first swath the pinning lamps are in operation and image portions not to be pinned may be printed in a second swath, wherein during the second swath the pinning lamps are not in operation. When the pinning lamps are not in operation, they may be switched off, may be in a stand-by mode or may emit radiation that is too weak to effectively induce pinning.

Each print head 4*a*-4*e* comprises an orifice surface 9 having at least one orifice 8, in fluid communication with a pressure chamber containing fluid marking material provided in the print head 4*a*-4*e*. On the orifice surface 9, a number of orifices 8 are arranged in a single linear array parallel to the sub-scanning direction Y, as is shown in FIG. 1B. Alternatively, the nozzles may be arranged in the main scanning direction X. Eight orifices 8 per print head 4*a*-4*e* are depicted in FIG. 1B, however obviously in a practical embodiment several hundreds of orifices 8 may be provided per print head 4*a*-4*e*, optionally arranged in multiple arrays.

The ink jet printing assembly 3 may further comprise curing means 11*a*, 11*b*. As shown in FIG. 1A, a scanning print carriage 12 carries the two curing means 11*a*, 11*b* and may be moved in reciprocation in the main scanning direction X parallel to the platen 1, such as to enable scanning of the image receiving medium 2 in the main scanning direction X. Alternatively, more than two curing means may be applied. It is also possible to apply page-wide curing means. If page-wide curing means are provided, then it may not be necessary to move the curing means in reciprocation in the main scanning direction X. The first curing means 11*a* may emit a first beam of UV radiation, the first beam having a first intensity. The first curing means 11*a* may be configured to provide the radiation for the pre-curing step. The second curing means 11*b* may emit a second beam of radiation, the second beam of radiation having a second intensity. The second curing means 11*b* may be configured to provide the radiation for the post-curing step. The first and second curing means 11 may fully cure the ink deposited by the print heads 4.

The carriage 12 is guided by guiding means 7. These guiding means 7 may be a rod as depicted in FIG. 1A. Although only one rod 7 is depicted in FIG. 1A, a plurality of rods may be used to guide the carriage 12 carrying the curing means 11. The rod 7 may be driven by suitable driving means (not shown). Alternatively, the carriage 12 may be guided by other guiding means, such as an arm being able to move the carriage 12.

The curing means may be energy sources, such as actinic radiation sources, accelerated particle sources or heaters. Examples of actinic radiation sources are UV radiation sources or visible light sources. UV radiation sources are preferred, because they are particularly suited to cure UV curable inks by inducing a polymerization reaction in such inks. Examples of suitable sources of such radiation are lamps, such as mercury lamps, xenon lamps, carbon arc lamps, tungsten filaments lamps, light emitting diodes (LED's) and lasers. In the embodiment shown in FIG. 1A, the first curing means 11*a* and the second curing means 11*b* are positioned parallel to one another in the sub scanning direction Y. The first curing means 11*a* and the second curing means 11*b* may be the same type of energy source or may be different type of energy source. For example, when the first and second curing means 11*a*, 11*b*, respectively both emit actinic radiation, the wavelength of the radiated emitted by the two respective curing means 11*a*, 11*b* may differ or may be the same. The first and second curing means are depicted as distinct devices. However, alternatively, only one source of UV radiation emitting a spectrum of radiation may be used, together with at least two distinct filters. Each filter may absorb a part of the spectrum, thereby providing two beams of radiation, each one having intensity different from the other.

The flat surface 1, the temperature control means, the carriage 5, the print heads 4*a*-4*d*, the carriage 12 and the first and second curing means 11*a*, 11*b* are controlled by suitable controlling means 10.

Figure 2:
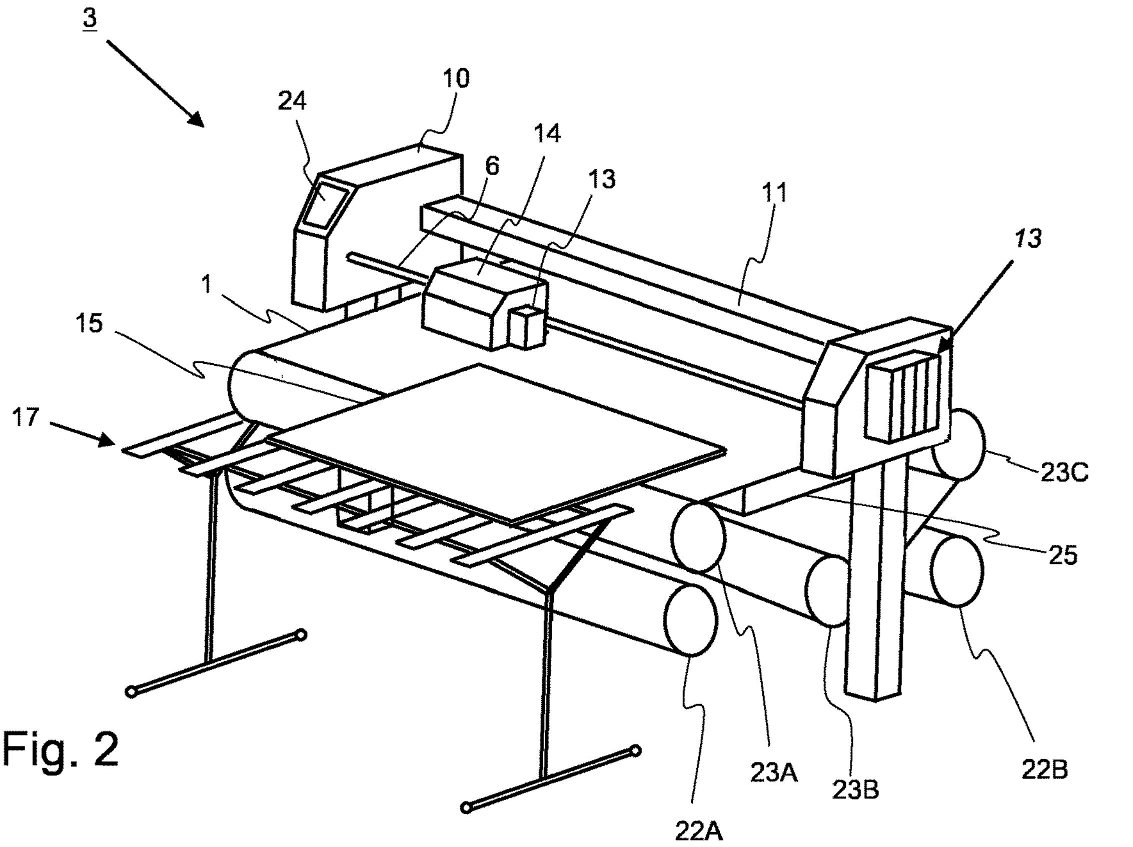
FIG. 2 is a schematic perspective view of a second embodiment of a printing system.

The printer 3 in FIG. 2 is a so-called hybrid printer, capable of handling both flexible media and rigid substrates. In FIG. 2, the printer 3 operates in a first print mode, wherein the printer 3 is configured for transporting rigid substrates, such as the recording medium 2. Such rigid print media 2 may be panels, for example panels for doors or walls, corrugated media, plates formed of plastic or metal, etc. To handle these rigid print media 2, the printer 3 in FIG. 2 is configured with a substantially linear transport path: from the media input device 17, the recording medium 2 moves forward along the inkjet printing assembly 14 at a at substantially constant height. The media input unit 17 and the receiving unit are positioned at the level of the medium support surface of the belt 4. In a second mode of the hybrid printer (not shown), a flexible web medium is supplied to the printer 1, which web medium 16 may be composed of e.g. paper, label stock, coated paper, plastic or textile. The web medium may be supplied from the input roller 22A and extends across the flat surface 1 to the take-up roller 22B, where the web medium 16 is re-wound. The printer 3 is configured to swiftly and efficiently switch between print modes.

The printer 3 shown in FIG. 2 comprises an inkjet printing assembly 14 for printing on a recording medium 2. The recording medium 2 in FIG. 2 is a relatively rigid substrate, such as a panel. The recording medium 2 is supplied from a media input unit 17, which may be configured for storing a plurality of such print media 2 and supplying these to the printer 1. The printer 3 comprises a medium support 1. Printer 3 may further comprise transport means for receiving and transporting the recording medium 2 along the inkjet printing assembly 14. In FIG. 2, the medium support is embodied as an endless belt 1. The endless belt is an endless transport belt 1 supported on a plurality of support rollers 23A, 23B, 23C. At least one of the support rollers 23A, 23B, 23C is provided with driving means for moving the belt 1. The belt 1 is therefore configured to support and transport the recording medium. Additionally, one or more one of the support rollers 23A, 23B, 23C may be configured to be moved and/or tilted to adjust and control the lateral position of the belt 1. The inkjet printing assembly 14 may be provided with a sensor (not shown), such as a CCD camera, to determine the relative position of belt 1 and/or the recording medium 2. Data from said sensor may be applied to control the position of the belt 1 and/or the recording medium 2. The belt 1 is further provided with through-holes and a suction box 25 in connection with a suction source (not shown), such that an underpressure may be applied to the recording medium 2 via the through-holes in the belt 1. The underpressure adheres the recording medium 2 flatly to the belt 1 and prevents displacement of the recording medium 2 with respect to the belt 1. Due to this holding the belt 1 is able to transport the recording medium 2. It will be appreciated that other suitable transport means, such as rollers, steppers, etc., may alternatively be applied. The recording medium 2 may be transported stepwise and/or in continuous movement.

The inkjet printing assembly 14 is configured to translate along a first guide beam 6 in a scanning direction. The scanning direction is perpendicular to the direction in which the print medium is transported by the belt 1. The inkjet printing assembly 14 holds a plurality of print heads (not shown), which are configured to jet a plurality of different marking materials (different colors of ink, primers, coatings, etc.) on the recording medium 2. Each marking material for use in the printing assembly 14 is stored in one of a plurality of containers arranged in fluid connection with the respective print heads for supplying marking material to said print heads to print an image on the recording medium 2.

The ejection of the marking material from the print heads is performed in accordance with data provided in the respective print job. The timing by which the droplets of marking material are released from the print heads determines their position on the recording medium 2. The timing may be adjusted based on the position of the inkjet printing assembly 14 along the first guide beam 6. The above mentioned sensor may therein be applied to determine the relative position and/or velocity of the inkjet printing assembly 14 with respect to the recording medium 2. Based upon data from the sensor, the release timing of the marking material may be adjusted.

Upon ejection of the marking material, some marking material may be spilled and stay on a nozzle surface of the print heads. The marking material present on the nozzle surface, may negatively influence the ejection of droplets and the placement of these droplets on the recording medium 2. Therefore, it may be advantageous to remove excess of marking material from the nozzle surface. The excess of marking material may be removed for example by wiping with a wiper and/or by application of a suitable anti-wetting property of the surface, e.g. provided by a coating.

The marking materials may require treatment to properly fixate them on the print medium. Thereto, a fixation unit 11 is provided downstream of the inkjet printing assembly 14. The fixation unit 11 may emit heat and/or radiation to facilitate the marking material fixation process. In the example of FIG. 1, the fixation unit 11 is a radiation emitter, which emits light of certain frequencies, which interacts with the marking materials, for example UV light in case of UV-curable inks. Further, the printer 3 shown in FIG. 2 comprises a page-wide curing array 11. The page-wide curing array 11 is an example of a fixing unit. The page-wide curing array extends in the main scanning direction. The page-wide curing array does not move in operation in the main scanning direction. The page-wide array may move in the direction of medium transport, which is a direction perpendicular to the scanning direction.

Further, the inkjet printing assembly 14 may be provided with a further pinning unit 13. Pinning unit 13 is provided on the same carriage which holds the print heads. This pinning unit 13 can be used to (partially) cure and/or harden the marking materials, independent of or interaction with the fixation unit 11.

After printing and fixation, the recording medium 2 is transported to a receiving unit (not shown). The receiving unit may comprise a take-up roller for winding up the recording medium 2, a receiving tray for supporting sheets of recording medium 2, or a rigid media handler, similar to the media input unit 14. Optionally, the receiving unit may comprise processing means for processing the medium after printing, e.g. a post-treatment device such as a coater, a folder, a cutter, or a puncher.

The wide-format printer 1 furthermore comprises a user interface 24 for receiving print jobs and optionally for manipulating print jobs. The local user interface unit 24 is integrated to the print engine and may comprise a display unit and a control panel.

Alternatively, the control panel may be integrated in the display unit, for example in the form of a touch-screen control panel. The local user interface unit 24 is connected to a control unit 10 connected to the printer 3. The control unit 10, for example a computer, comprises a processor adapted to issue commands to the printer 3, for example for controlling the print process. The printer 3 may optionally be connected to a network. The connection to the network can be via cable or wireless. The printer 3 may receive printing jobs via the network. Further, optionally, the control unit 10 of the printer 3 may be provided with an input port, such as a USB port, so printing jobs may be sent to the printer 3 via this input port.

Figure 3:
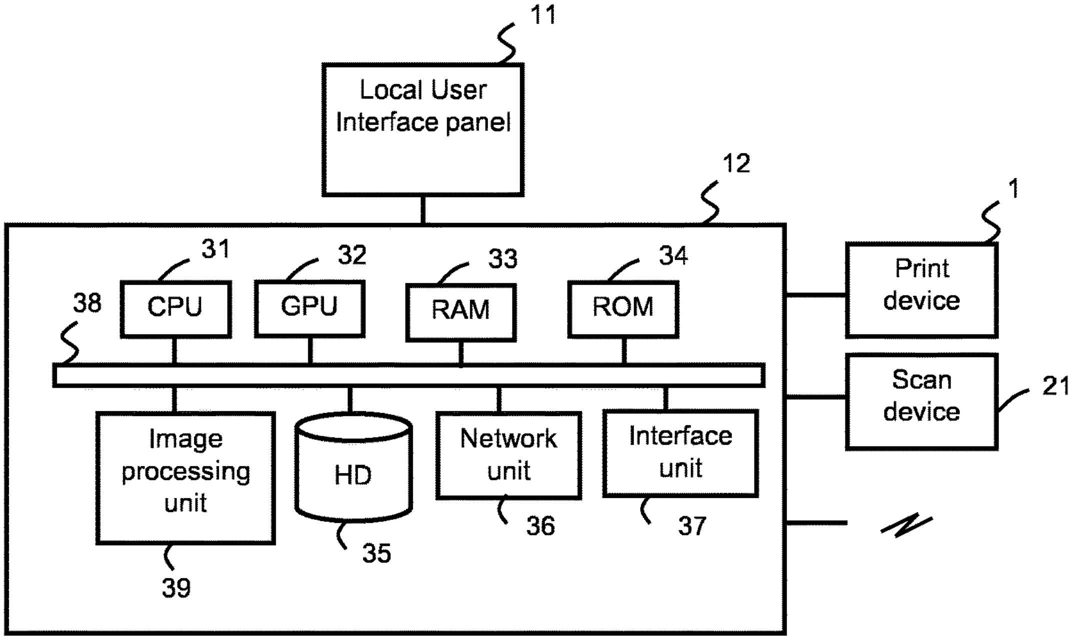
FIG. 3 is a schematic diagram of a control unit of a reprographic system according to FIG. 1A or 2.

An embodiment of the control unit 10 is in more detail presented in FIG. 3. As shown in FIG. 3, the control unit 10 comprises a Central Processing Unit (CPU) 31, a Graphical Processor Unit (GPU) 32, a Random Access Memory (RAM) 33, a Read Only Memory (ROM) 34, a network unit 36, an interface unit 37, a hard disk (HD) 35 and an image processing unit 39 such as a Raster Image Processor (RIP). The aforementioned units 31-37 are interconnected through a bus system 38. However, the control unit 10 may also be a distributed control unit.

The CPU 31 controls the printing system 1 in accordance with control programs stored in the ROM 34 or on the HD 35 and the local user interface panel 5. The CPU 31 also controls the image processing unit 34 and the GPU 32. The ROM 34 stores programs and data such as boot program, set-up program, various set-up data or the like, which are to be read out and executed by the CPU 31. The hard disk 35 is an example of a non-volatile storage unit for storing and saving programs and data which make the CPU 31 execute a print process to be described later. The hard disk 35 also comprises an area for saving the data of externally submitted print jobs. The programs and data on the HD 35 are read out onto the RAM 33 by the CPU 31 as needed. The RAM 33 has an area for temporarily storing the programs and data read out from the ROM 34 and HD 35 by the CPU 31, and a work area which is used by the CPU 31 to execute various processes. The interface unit 37 connects the control unit 10 to the client devices 21-24 and to the printing system 1. The network unit 36 connects the control unit 10 to the network N and is designed to provide communication with the workstations 22-24, and with other devices 21 reachable via the network N. The image processing unit 39 may be implemented as a software component running on an operation system of the control unit 10 or as a firmware program, for example embodied in a field-programmable gate array (FPGA) or an application-specific integrated circuit (ASIC). The image processing unit 39 has functions for reading, interpreting and rasterizing the print job data. Said print job data contains image data to be printed (i.e. fonts and graphics that describe the content of the document to be printed, described in a Page Description Language or the like), image processing attributes and print settings.

Figure 4A:
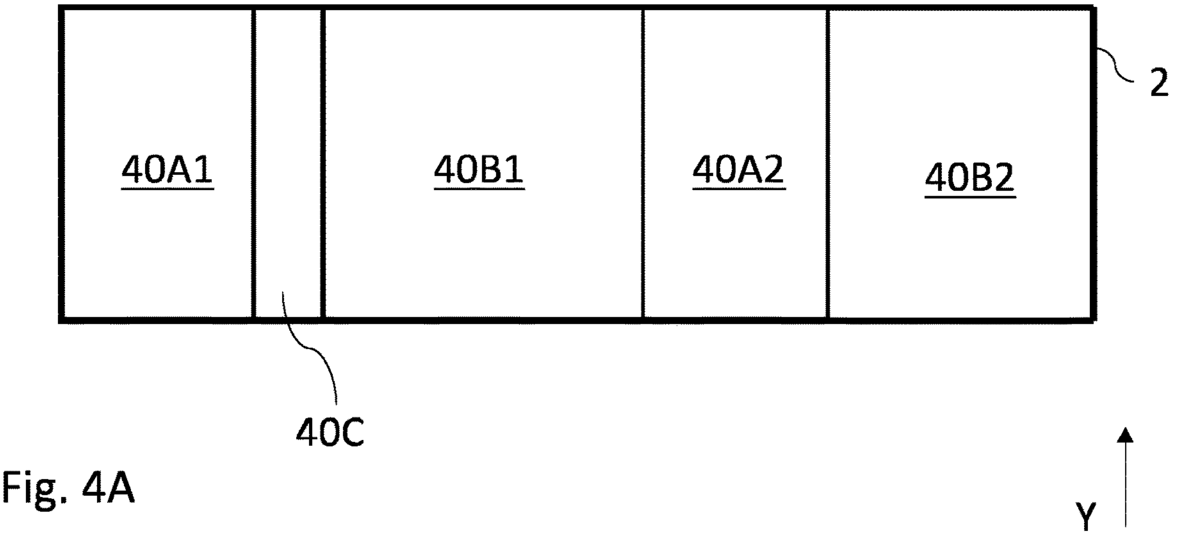
FIG. 4A-4C show a schematic top view of a first example of the method according to the present invention.
Figure 4B:
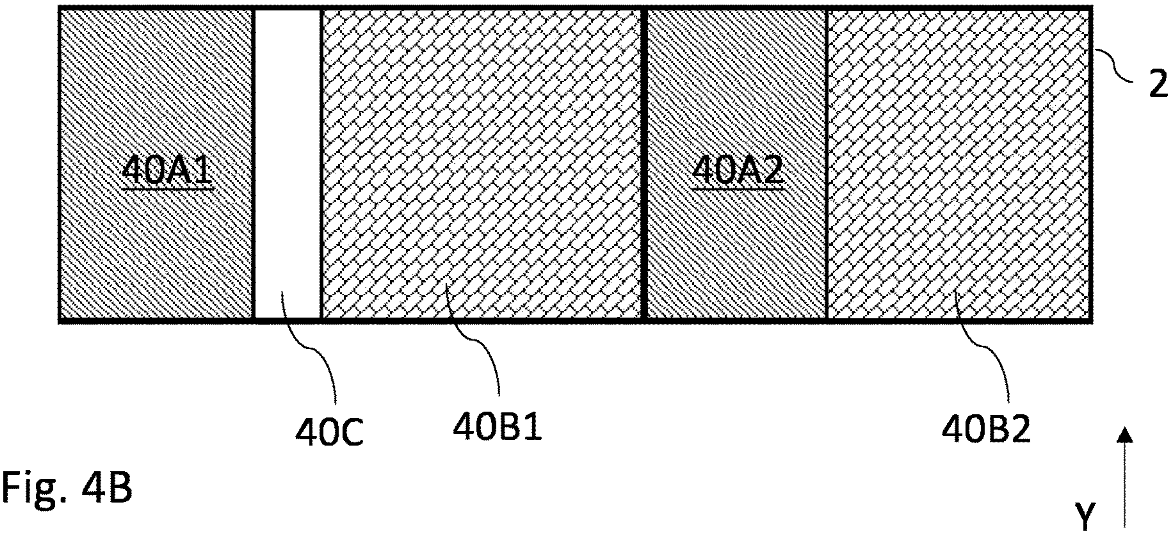
Figure 4C:
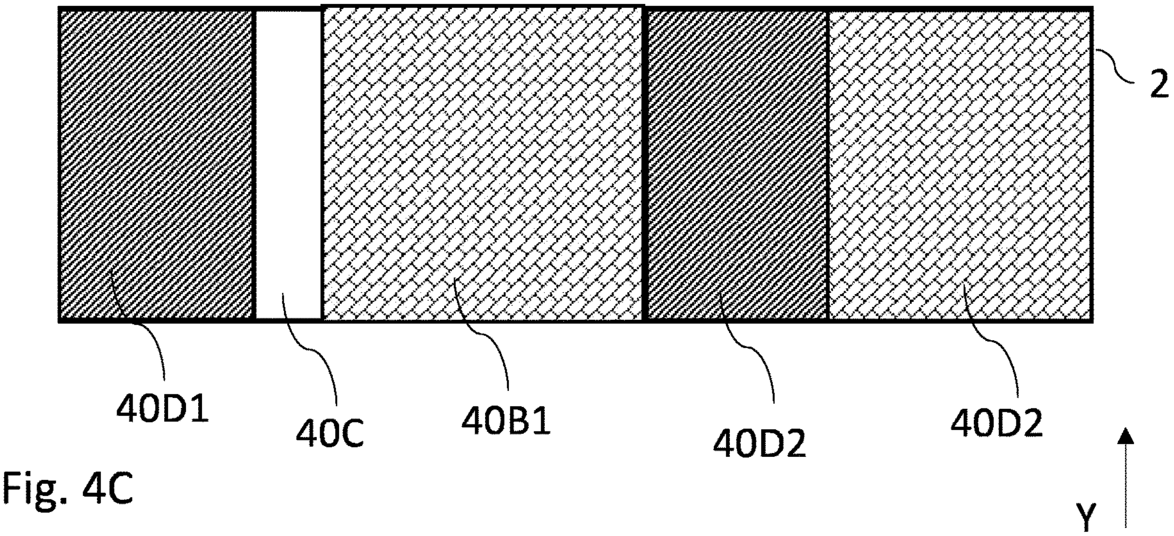

FIG. 4A-4C shows a schematic representation of a first example of the method according to the present invention.

FIG. 4A shows a recording medium 2 when viewed from above. The recording medium has a plurality of sections 40A1, 40A2, 40B1, 40B2 and 40C. The sections of the recording medium may be determined by the image to be applied on the recording medium 2. The recording medium has two first sections 40A1, 40A2, two second section 40B1, 40B2 and a third section 40C.

Ink may be applied onto the recording medium. In the respective sections of the recording medium, ink may be applied.

In FIG. 4B, ink has been applied onto the recording medium. In the first sections 40A1, 40A2 of the recording medium 2, a support layer was provided. In the second sections 40B1, 40B2 of the recording medium 2, a first image portion was provided. In the third section 40C of the recording medium, no ink was applied.

The ink deposited to form the support layer and the first image portion is cured. The ink may be fixed instantaneously after being deposited onto the recording medium 2. Alternatively, there may be a small time interval between deposition of the ink and fixing of the ink. After depositing the support layer and the first image portion and fixing the support layer and the first image portion, the second image portion may be applied.

In FIG. 4C, a second image portion 40D1, 40D2 has been applied onto the support layers provided on the first sections 40A1, 40A2 of the recording medium 2. In the top view shown in FIG. 4C, a glossy portion of the image is now formed on the first sections 40A1, 40A2 of the recording medium 2, whereas matt portions are formed in the second sections 40B1, 40B2 of the recording medium 2.

Figure 5A:
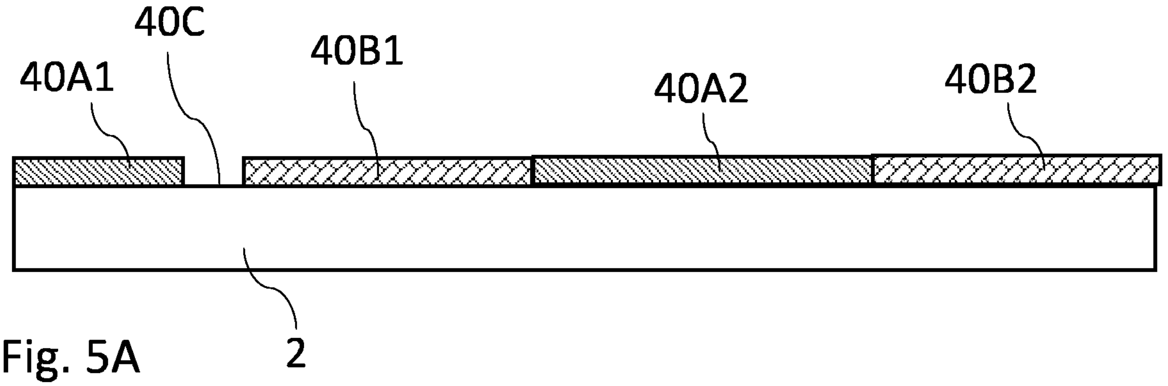
FIG. 5A-5B show a schematic front view of a first example of the method according to the present invention.
Figure 5B:
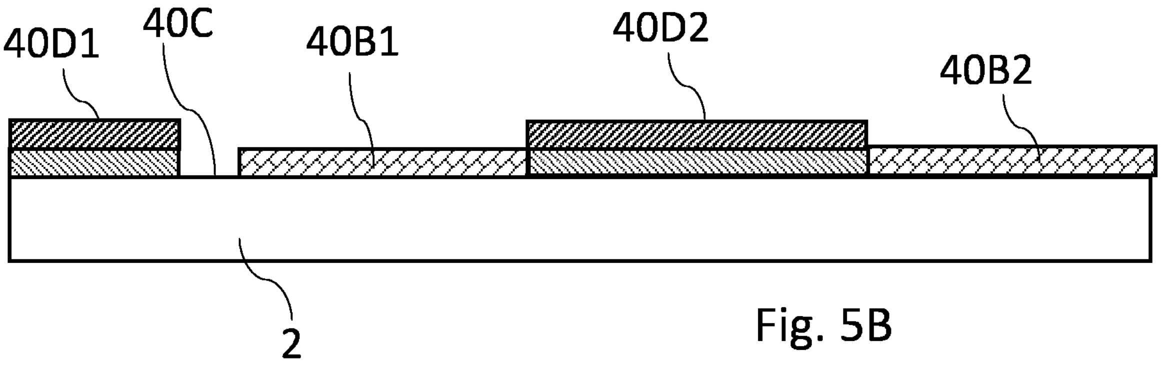

FIG. 5A-5B show a schematic representation of a first example of the method according to the present invention.

FIG. 5A shows a frontal view recording medium 2. In FIG. 5A, ink has been applied onto the recording medium. In the first sections 40A1, 40A2 of the recording medium 2, a support layer was provided. In the second sections 40B1, 40B2 of the recording medium 2, a first image portion was provided. In the third section 40C of the recording medium, no ink was applied.

The ink deposited to form the support layer and the first image portion is cured. The ink may be fixed instantaneously after being deposited onto the recording medium 2. Alternatively, there may be a small time interval between deposition of the ink and fixing of the ink. After depositing the support layer and the first image portion and fixing the support layer and the first image portion, the second image portion may be applied.

In FIG. 5B, a second image portion 40D1, 40D2 has been applied onto the support layers provided on the first sections 40A1, 40A2 of the recording medium 2. In the front view shown in FIG. 5B, a glossy portion of the image is now formed on the first sections 40A1, 40A2 of the recording medium 2, whereas matt portions are formed in the second sections 40B1, 40B2 of the recording medium 2.

Figure 6A:
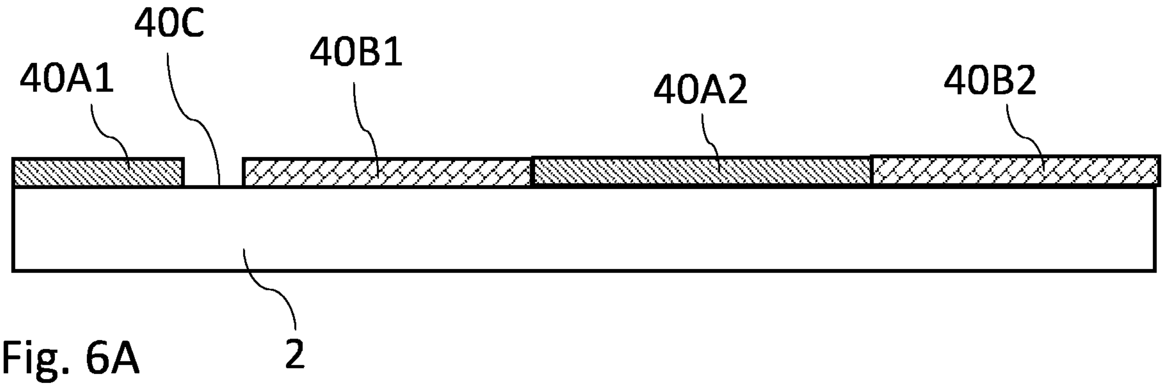
FIG. 6A-6C show a schematic front view of a second example of the method according to the present invention.
Figure 6B:
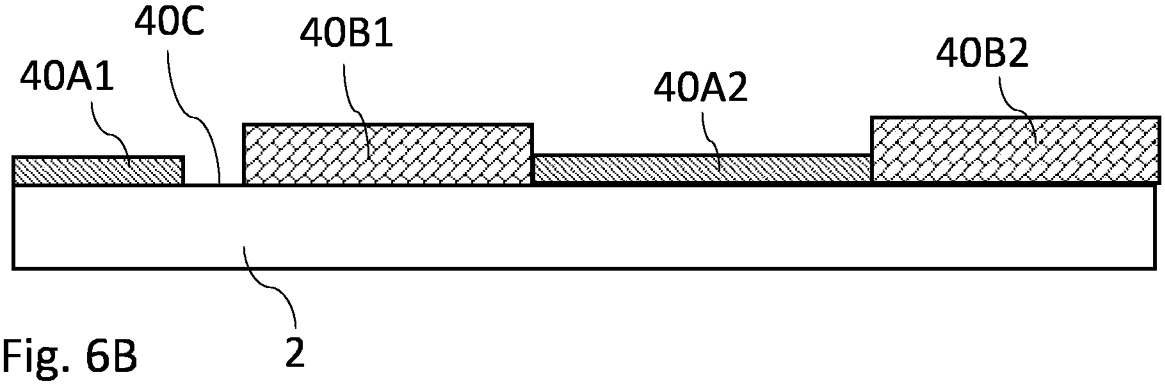
Figure 6C:
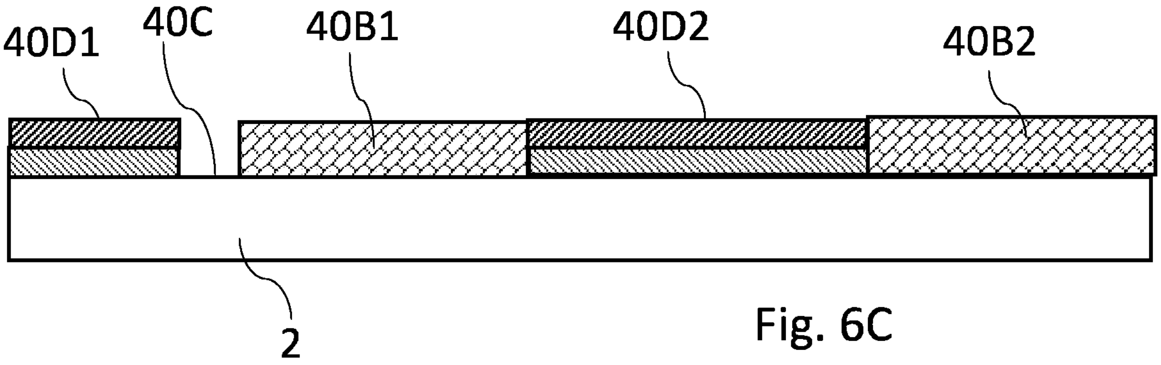

FIG. 6A-6C show a schematic representation of a second example of the method according to the present invention.

FIG. 6A shows a frontal view recording medium 2. The situation shown in FIG. 6A corresponds to the situation shown in FIG. 5A.

FIG. 6B also shows a frontal view of the recording medium 2. In the situation shown in FIG. 6B, an additional layer has been applied onto the second sections 40B1, 40B1 of the recording medium 2. The support layer and the first layer of the second image portion applied onto the second sections 40B1, 40B1 of the recording medium 2 may preferably be fixed before the additional layer is applied onto the second sections 40B1, 40B1 of the recording medium 2. Alternatively, the support layer and the first layer of the second image portion applied onto the second sections 40B1, 40B1 of the recording medium 2 may not yet be fixed before the additional layer is applied onto the second sections 40B1, 40B1 of the recording medium 2.

FIG. 6C also shows a frontal view of the recording medium 2. In the situation shown in FIG. 6C, a second image portion 40D1, 40D2 has been applied onto the support layers provided on the first sections 40A1, 40A2 of the recording medium 2. The thickness of the ink layer provided in the first sections 40A1, 40A2 of the recording medium 2 is substantially the same as the thickness of the ink layer provided in the second sections 40B1, 40B2 of the recording medium 2. In the front view shown in FIG. 6C, a glossy portion of the image is now formed on the first sections 40A1, 40A2 of the recording medium 2, whereas matt portions are formed in the second sections 40B1, 40B2 of the recording medium 2.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually and appropriately detailed structure. In particular, features presented and described in separate dependent claims may be applied in combination and any combination of such claims are herewith disclosed. Further, the terms and phrases used herein are not intended to be limiting; but rather, to provide an understandable description of the invention. The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly.

The invention claimed is:

1. A method for printing an image onto a porous recording medium, the image having matt portions and glossy portions, the method comprising the steps of:

a. forming a support layer on a first section of the recording medium by applying a radiation-curable ink and forming a first image portion on a second section of the recording medium by applying a radiation-curable ink;

b. fixing the support layer and the first image portion; wherein a time interval between applying the support layer and first image portion and fixing the support layer and first image portion is less than 3 seconds;

c. forming a second image portion on top of the support layer in the first section of the recording medium by applying a radiation-curable ink; and d. fixing the second image portion;

wherein the support layer is applied by applying a radiation-curable gelling ink;

wherein the second image portion is applied by applying a radiation-curable gelling ink;

wherein the first image portion is applied by applying a radiation-curable gelling ink; and wherein a time interval between applying a second image portion and fixing the second image portion is in the range of 3 seconds to 200 seconds.

2. The method according to claim 1, wherein the support layer is formed by applying at least one of a white ink and a colorless ink.

3. The method according to claim 1, wherein step a is repeated before step c is performed.

4. The method according to claim 1, wherein in step c, the second image portions is applied in a plurality of ink layers.

5. The method according to claim 1, wherein the first image portion is a matt portion of the image.

6. The method according to claim 1, wherein the second image portion is a glossy portion of the image.

7. A printing apparatus comprising:

a media support for supporting a recording medium;

a first ink applicator configured to in operation form a support layer on the recording medium;

a second ink applicator configured to in operation form an image portion to the recording medium;

a fixing unit; and a controller configured to control the printing apparatus to perform the method according to claim 1.

8. The method according to claim 1, wherein a time interval between applying the support layer and first image portion and fixing the support layer and first image portion is less than 1 second.

* * * * *